March 29, 1960 — R. F. BRYSON — 2,930,255
DUAL DRIVE TRANSMISSIONS
Filed Nov. 28, 1958

ROBERT F. BRYSON
INVENTOR.

BY
ATTORNEY

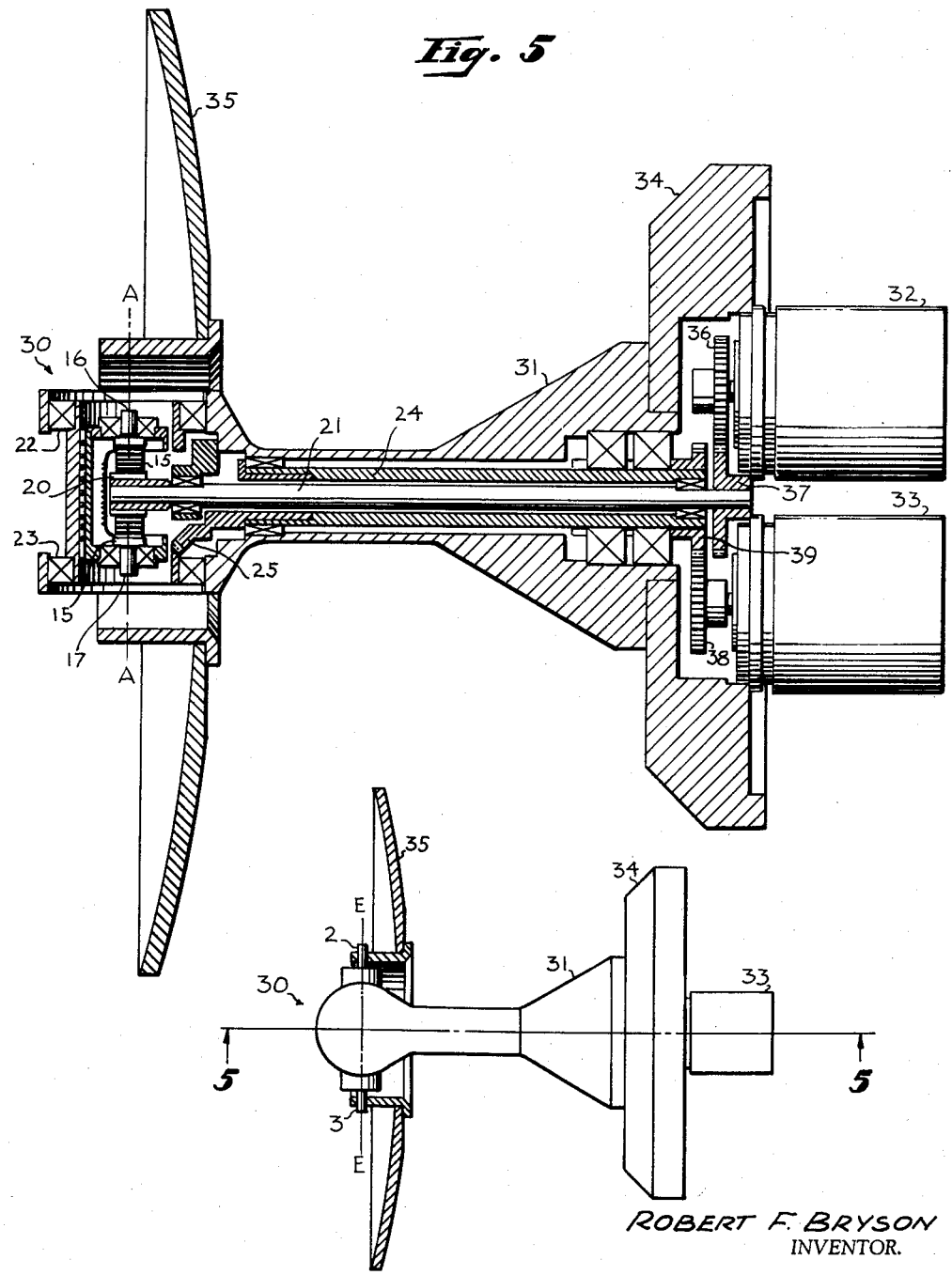

United States Patent Office 2,930,255
Patented Mar. 29, 1960

2,930,255

DUAL DRIVE TRANSMISSIONS

Robert F. Bryson, Los Angeles, Calif., assignor to Thompson Ramo Wooldridge Inc., Los Angeles, Calif., a corporation of Ohio Application November 28, 1958, Serial No. 776,788

6 Claims. (Cl. 74—665)

This invention relates to dual drive transmissions and more particularly to a dual drive transmission for positioning one or more shafts about two separately disposed axes of rotation.

In many types of mechanical systems it is necessary to position a member rotationally about two separate axes of rotation. For example, in radar systems an antenna may be positioned rotationally around a first fixed axis corresponding to an azimuth measurement and may be rotationally positioned around a second axis normal to the fixed axis corresponding to an elevation measurement.

In many instances, a radar antenna is caused to follow a predetermined traverse known as a "scan pattern" in which it is necessary to realize a simultaneous adjustment of both elevation and azimuth. Although various constructions of transmissions for securing the combination of elevation and azimuth positioning of a radar antenna are described in the book "Radar Scanners and Radomes," Radiation Laboratories Series, vol. 26, published by McGraw-Hill, New York, in 1948, generally known transmissions for this purpose require counterbalanced weights and have a large moment of inertia. In addition, many known types of transmission systems for achieving the positioning of an element around two rotational axes utilize differential drive systems in which the rotational movement around one axis is interrelated with the rotational movement about the other axis so that independent adjustment of the rotational position about one axis cannot be secured.

In other types of known transmissions which incorporate mutually independent drive systems for positioning an antenna in azimuth and in elevation, distortion of the scan patterns occurs since the intersection of the axes of rotation is offset from the center of the antenna due to the fact that the transmission is relatively large and the drive mechanism cannot be located at the center of the reflector or antenna. An additional disadvantage of known types of transmission systems is that direct coupled position sensing elements cannot be used with the result that additional mechanisms are required to link the transmission system with the sensing device with an attendant loss of accuracy.

Accordingly, it is a primary object of the invention to provide a new and improved dual drive transmission in which an element may be independently positioned rotationally around two separate axes.

It is an additional object of the present invention to provide a new and improved transmission for use in conjunction with a radiation transmitting or receiving system by means of which an antenna may be rotated in elevation and azimuth about axes which intersect at the center of the reflector.

It is yet another object of the invention to provide a transmission system for an antenna positioning system in which simultaneous changes in azimuth and elevation may be made separately and independently.

It is still another object of the invention to provide a new and improved antenna positioning system in which sensing elements for identifying the position of the radar antenna may be directly coupled to the transmission.

Briefly, in accordance with one aspect of the invention, there is provided a dual drive transmission including a hub rotatable about a fixed axis, at least one shaft is radially supported by the hub for rotation about an axis other than the fixed axis, a first independent drive system is linked to the hub for rotating the hub about the fixed axis, and a second independent drive system is linked to the shaft for rotating the shaft about said other axis.

In one arrangement of the invention, a splined sleeve is supported within a rotatable hub which may be raised and lowered for rotation of a pair of shafts around an axis normal to the axis of rotation of the hub. By providing independent drive means for raising and lowering the splined sleeve, the rotational position of the shafts is independent of the rotational position of the hub. For example, a dual drive transmission in accordance with the invention may include a first drive shaft coupled to the splined sleeve by means of a swiveled offset rack and pinion to raise and lower the splined sleeve within the hub. By means of rack and pinion gears linking the splined sleeve with the shafts radially supported by the hub, the radial shafts may be rotationally positioned by turning the drive shaft. By means of a gear train between a second drive shaft and the hub, the hub may be rotationally positioned around a fixed axis independent of the position of the radial shafts.

In a particular application of the present invention to a radiation transmitting or receiving system, an antenna may be affixed to a pair of radial shafts extending from opposite sides of a rotatable hub containing a splined sleeve radial shaft drive system in accordance with the invention. In addition, a coaxial drive shaft system may be linked separately to the hub and the radial drive shaft system, so that the antenna may be positioned in elevation through rotation of the radial shafts and azimuth through a rotation of the hub.

A better understanding of the invention may be had from a reading of the following detailed description and an inspection of the drawings, in which:

Fig. 4 is a plan view of an antenna positioning system incorporating a dual drive transmission in accordance with the invention, with the reflector broken away to illustrate the connection to the transmission; and Fig. 5 is a sectional view taken along line 5—5 of Fig. 4.

Figure 1:
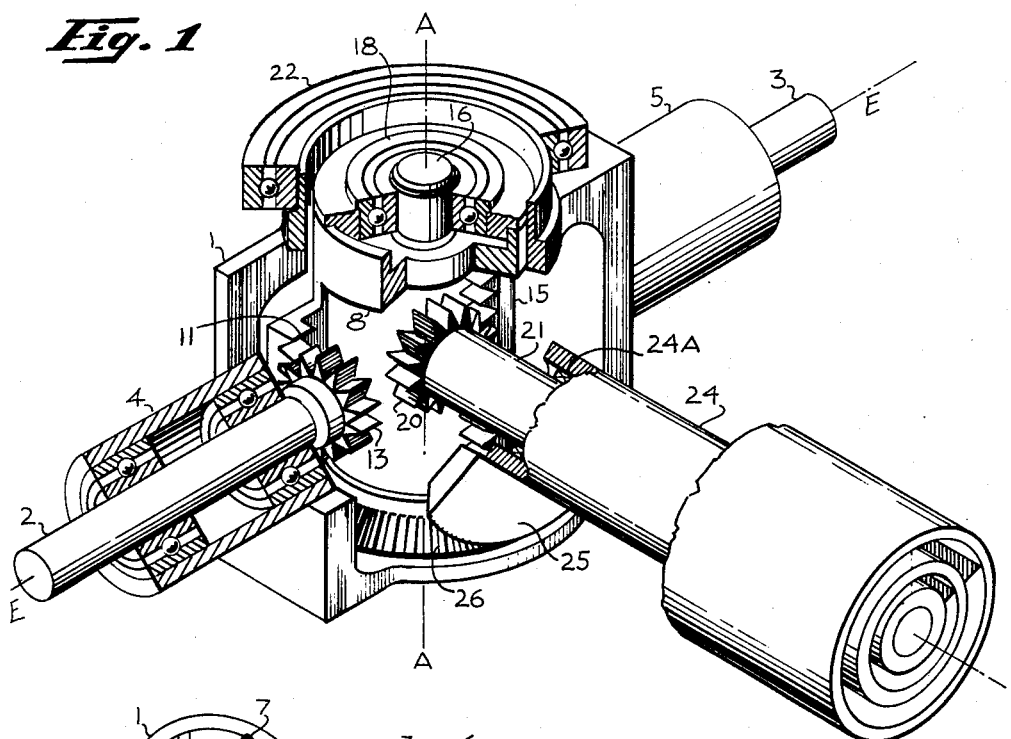
Fig. 1 is a perspective view, partially cut away, illustrating a dual drive transmission in accordance with the invention.

Referring to the drawings in detail, in which the same reference characters have been used throughout the several views to designate the same parts, a dual drive transmission in accordance with the invention is illustrated in which a rotatable hub 1 supports a pair of radial shafts 2 and 3 on a common horizontal axis identified by the line E—E. The shafts 2 and 3 may be supported in the hub 1 for rotation around the elevational axis within cylindrical radial extensions 4 and 5, either formed integrally with or fastened to the hub 1. As may be seen in Fig. 1, a pair of conventional bearings may be included in each of the radial extensions 4 and 5 to maintain the shafts in proper position.

The hub 1 is rotatable around a fixed axis identified by the line A—A. As may be seen in Fig. 1, the axis A—A intersects the axis E—E so that the axis of rotation of the hub 1 is normal to the axis of rotation of the shafts 2 and 3, and so that the shafts 2 and 3 are positionable with respect to two separate axes of rotation. A semi-cylindrical sleeve 8 is supported within the hub 1 and is linked thereto for rotational movement by a plurality of ball bearings disposed in one or more separate vertical raceways, each of which is formed by pairs of adjacent grooves 6 and 7 machined parallel to the axis of rotation A—A in the hub 1 and the sleeve 8.

Figure 2:
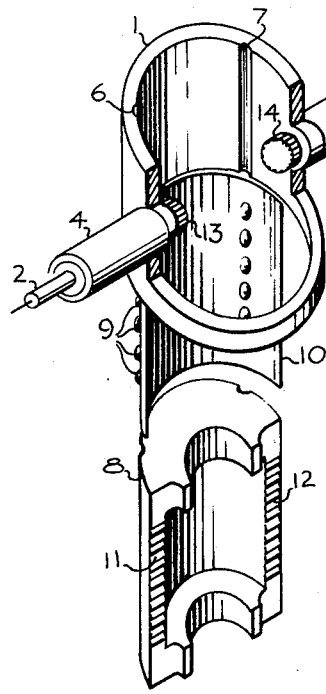
Fig. 2 is a diagrammatic exploded perspective view of a splined sleeve radial shaft drive system in accordance with the invention.

As illustrated in Fig. 2, the linear ball bearings 9 may be held in spaced relationship by a semi-cylindrical bearing retainer 10 having apertures for receiving the balls 9. The retainer 10 is positioned between the hub 1 and the semi-cylindrical sleeve 8 when the transmission is assembled, and moves along with the ball bearings 9. Accordingly, the sleeve 8 is linked to the hub 1 in the manner of a spline and turns together with the hub 1 around the rotational axis A—A but is free to move relative to the hub 1 in a direction parallel to the axis A—A.

In order to link the sleeve 8 with the shafts 2 and 3, a pair of racks 11 and 12 may be integrally formed with or affixed to the sleeve 8. A pair of pinion gears 13 and 14 are attached to the inner ends of the shafts 2 and 3 in engagement with the racks 11 and 12. In operation, as the sleeve 8 is raised and lowered within the hub 1 in a direction parallel to the axis of rotation A—A, the racks 11 and 12 function to impart rotational movement to the shafts 2 and 3 about the axis E—E via the gears 13 and 14.

Figure 3:
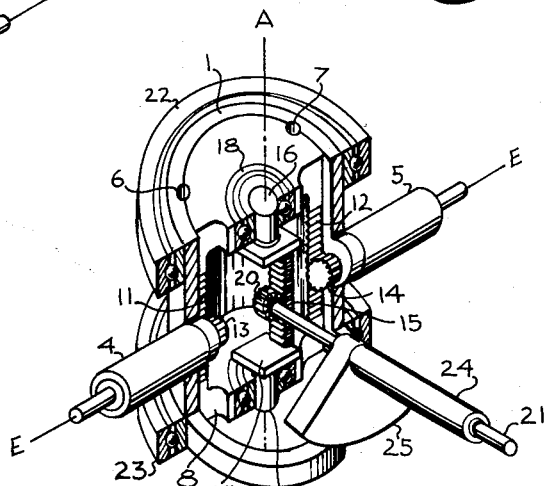
Fig. 3 is a diagrammatic perspective view showing the parts illustrated in Fig. 2 in assembled form along with two independent drive systems in accordance with the invention.

A first independent drive system for use in raising and lowering the sleeve in the transmission of the invention is provided by means of a swiveled rack 15 which is supported on trunnions 16 and 17. The trunnions 16 and 17 may be rotationally supported along the axis A—A by means of bearings, such as the bearing 18 (Figs. 1 and 3). A pair of spacer rings may be arranged to support the bearings at each end of the sleeve 8, such as the spacer ring 18A associated with the bearing 18 (Fig. 4). The swiveled rack 15 is engaged by a drive pinion 20 attached to a drive shaft 21 which may be rotatable around the fixed axis intersecting the axis A—A. As the drive shaft 21 turns, the drive pinion 20 raises or lowers the swiveled rack which in turn raises or lowers the sleeve 8. Thus, the racks 11 and 12 are raised and lowered to impart rotational movement around the axis E—E to the shafts 2 and 3.

However, since the rack 15 is supported within the sleeve 8 by the trunnions 13 and 14, the sleeve 8 along with the hub 1 is free to rotate about the axis A—A. Accordingly, the shafts 2 and 3 may be rotated independently of the position of the hub 1 and since the radial position of the shafts 2 and 3 is determined by the position of the hub 1, the transmission illustrated in Figs. 1–3 is capable of positioning the radial shafts 2 and 3 about two separate rotational axes.

The position of the radial shafts 2 and 3 about the radial axis A—A is determined by the position of the rotatable hub 1 which may be supported for rotational movement at each end in a suitable bearing, such as an upper circular bearing 22 (partially shown in Figs. 1–3), and a lower circular bearing 23 (partially shown in Fig. 3). In the particular arrangement of the invention illustrated herein, a coaxial drive system is employed in which a drive shaft 20 is coaxially disposed within a hollow cylindrical drive shaft 24. A gear sector 25 attached to the cylindrical drive shaft 24 meshes with a ring gear 26 fastened to and formed integrally with the hub 1. Accordingly, by rotation of the hollow drive shaft 24, the hub 1 may be rotated with a consequent positioning of the radial shafts 2 and 3 around the rotational axis A—A. The coaxial drive shafts 21 and 24 may be held in coaxial alignment for independent rotational movement by suitable bearings such as the spacer bearings 24A (partially shown in Fig. 1). Therefore, through an independent rotational movement of the drive shafts 21 and 24, the radial shafts 2 and 3 may be independently positioned with respect to the rotational axis A—A and about the rotational axis E—E.

A particular application of a dual drive transmission in accordance with the invention for use in positioning the reflector of a radar antenna is illustrated in Figs. 4 and 5 in which a transmission similar to that described above is designated generally at 30. The transmission 30 may be supported in the arrangement of Figs. 4 and 5 by means of a fork-shaped yoke 31 within the separated arms of which there may be fastened upper and lower bearings 22A and 22B (Fig. 5). The shaft of the yoke 31 may preferably be hollow to accommodate the coaxial drive arrangement described above in connection with Figs. 1–3. In Figs. 4 and 5 the yoke 31, as well as a pair of drive motors 32 and 33 are supported from a base 34 which is adapted to be fastened to a suitable support structure (not shown).

In the arrangement of Figs. 4 and 5 a reflector 35 is attached to the ends of the radial shafts 2 and 3. The drive motor 32 functions to rotate the inner shaft 21 via a gear train comprising the gears 36 and 37. Thus, the motor 32 functions to raise and lower the splined sleeve within the hub 1 to turn the radial shafts 2 and 3 about the E—E axis so that the reflector 35 is positioned in accordance with elevation.

The drive motor 33 functions to turn the outer drive shaft 24 via a gear train comprising the gears 38 and 39. Thus, the drive motor 33 functions to rotate the hub 1 about the axis A—A so that the reflector 35 is postioned in azimuth. By connecting the motors 32 and 33 to a suitable source of electrical signals, the reflector 35 may be brought to any desired position or may be caused to follow a predetermined pattern of scanning. Since each of the drive systems of the invention for positioning the reflector 35 in elevation and azimuth is independent of the other, simple conventional transducers, such as selsyns or potentiometers may be linked to the drive systems for sensing accurately the position of the reflector.

Although a particular application of a dual drive transmission in a radar antenna system has been shown in Figs. 4 and 5 and described above by way of example, the invention is not limited thereto. Examples of other types of devices in which the transmission of the invention may be used to advantage include gyroscopes, sextants, theodolites, transits, telescopes, periscopes, spotlights, searchlights, aircraft and missile control surface positioning systems for helicopter rotor blades, atomic energy manipulators, surgical instruments, and prosthetic devices. It will be appreciated that the transmission of the invention may be readily adapted for any of the above and other uses where a dual drive transmission having superior characteristics is required. Therefore, any and all modifications, variations or equivalent arrangements falling within the scope of the annexed claims should be considered to be a part of the invention.

What is claimed is:

1. A dual drive transmission including the combination of a hub rotatable about a fixed axis, a pair of shafts radially supported by the hub, each of said shafts being rotatable about an axis normal to said fixed axis, a splined sleeve supported within the hub for rotational movement therewith, a first rack and pinion linking one of the shafts and the splined sleeve, a second rack and pinion linking the other of the shafts and the splined sleeve, a third rack and pinion mounted within the splined sleeve on trunnions located along said fixed axis for transporting said splined sleeve relative to said hub in a direction parallel to said fixed axis, a first independent drive system linked to the hub for rotating the hub about said fixed axis, and a second independent drive system linked to said third rack and pinion for transporting the splined sleeve whereby the pair of shafts and the hub may be independently positioned.

2. A dual drive transmission including the combination of a semi-cylindrical hub rotatable about a fixed axis, a pair of shafts radially supported by the hub, each of said shafts being rotatable about an axis normal to said fixed axis, a semi-cylindrical sleeve supported within the hub, means linking the hub to the sleeve for rotation around said fixed axis, a first rack affixed to the sleeve, a first pinion gear attached to one of said shafts and meshed with said first rack, a second rack affixed to the sleeve, a second pinion gear affixed to the other of said shafts and meshed with the second rack, a concentric drive system comprising an inner drive shaft and an outer hollow drive shaft coaxially arranged along an axis normal to the fixed axis, a third rack supported on trunnions within the sleeve, said trunnions being located along said fixed axis, said third rack being offset from said fixed axis, and a third pinion gear attached to the inner drive shaft and meshed with the third rack for transporting the sleeve relative to the hub in a direction parallel to the fixed axis, and a gear train linking the outer drive shaft to the hub whereby the hub and the pair of shafts may each be rotated independently.

3. A dual drive transmission for use in conjunction with a radar system in which an antenna is positioned in azimuth and elevation including the combination of a semi-cylindrical hub rotatable about a fixed axis, a pair of shafts radially supported by the hub, said pair of shafts being adapted to support a directional antenna for rotation around said fixed axis with the hub in azimuth, each of said shafts being rotatable about an axis normal to said fixed axis for positioning the antenna in elevation, a semi-cylindrical sleeve supported within the hub, means linking the semi-cylindrical sleeve to the hub for rotational movement therewith, a first rack affixed to the sleeve, a first pinion gear affixed to one of said shafts and meshed with the first rack, a second rack affixed to the sleeve, a second pinion gear affixed to the other of said shafts and meshed with the second rack, an elevation drive shaft, a trunnioned rack supported by the sleeve for raising and lowering the sleeve within the hub to rotate the pair of shafts for positioning the antenna in elevationfi a third pinion gear attached to the elevation drive shaft engaging the trunnioned rack and means linked to the hub for rotating the hub about said fixed axis for positioning the antenna in azimuth.

4. A dual drive transmission having intersecting azimuth and elevation axes including the combination of a semi-cylindrical hub rotatable about the azimuth axis, a pair of shafts radially supported by the hub, each of said shafts being rotatable about the elevation axis, a semi-cylindrical sleeve supported within the hub for rotational movement therewith, an offset swiveled rack mounted within the sleeve, a pinion gear engaging the offset rack for raising and lowering the sleeve in a direction parallel to the azimuth axis, means linking the sleeve to the pair of shafts for rotational movement of the shafts about the elevation axis as the sleeve is raised and lowered, and means linked to the hub for rotating the hub about the azimuth axis whereby the position of the hub about the azimuth axis may be established independent of the position of the shafts about the elevation axis.

5. A dual drive transmission for use in conjunction with a system for positioning an antenna independently in azimuth and elevation including the combination of a transmission housing rotatable about a fixed axis, a pair of antenna supporting shafts radially supported by the housing for rotation about an axis corresponding to elevation, a splined sleeve supported within the housing for rotational movement therewith, a pair of coaxial drive shafts supported in fixed position and extending within the housing, a pinion gear attached to a first one of the coaxial drive shafts within the housing, a trunnioned rack supported by the sleeve in a fixed position with respect to the pinion and linked to the sleeve for raising and lowering the sleeve within the housing irrespective of the rotational position of the housing and sleeve with respect to the pinion, means linking the sleeve to the radial shafts for rotating the radial shafts about an axis corresponding to elevation as the rack is raised and lowered, and means linking a second one of the coaxial drive shafts to the housing for effecting a rotational movement of the housing about an axis corresponding to azimuth whereby through an independent rotation of each of the coaxial drive shafts the radial shafts are independently positionable about two intersecting axes corresponding to azimuth and elevation.

6. A dual drive transmission for positioning a member rotationally about intersecting azimuth and elevation axes including the combination of a pair of coaxial drive shafts, a pinion attached to a first one of the coaxial drive shafts, a rack engaging the pinion, a sleeve rotatably supported by the rack with the rack being disposed within the sleeve, at least two radial drive shafts linked to the rotatable sleeve, and means linking a second one of the coaxial drive shafts to the radial shafts for rotational movement about an axis corresponding to azimuth whereby the radial shafts may be independently rotated about two separate intersecting axes corresponding to azimuth and elevation in response to rotation of the coaxial drive shafts.

References Cited in the file of this patent

UNITED STATES PATENTS

| | | |
|---|---|---|
| 2,313,768 | Putt | Mar. 16, 1943 |
| 2,410,827 | Langstroth et al. | Nov. 12, 1946 |
| 2,410,831 | Maybarduk et al. | Nov. 12, 1946 |
| 2,512,636 | Flynt | June 27, 1950 |
| 2,557,967 | Hudson | June 26, 1951 |
| 2,762,234 | Dodd | Sept. 11, 1956 |
| 2,840,817 | Watters et al. | June 24, 1958 |